(12) United States Patent
Chang

(10) Patent No.: US 9,787,880 B2
(45) Date of Patent: Oct. 10, 2017

(54) VIDEO PRE-PROCESSING METHOD AND APPARATUS FOR MOTION ESTIMATION

(71) Applicant: INDUSTRIAL TECHNOLOGY RESEARCH INSTITUTE, Hsinchu (TW)

(72) Inventor: Yuan-Teng Chang, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 674 days.

(21) Appl. No.: 14/248,027

(22) Filed: Apr. 8, 2014

(65) Prior Publication Data

US 2015/0146108 A1 May 28, 2015

(30) Foreign Application Priority Data

Nov. 27, 2013 (TW) .............................. 102143259 A

(51) Int. Cl.
*H04N 5/14* (2006.01)
*H04N 19/85* (2014.01)
(Continued)

(52) U.S. Cl.
CPC ........... *H04N 5/145* (2013.01); *H04N 19/137* (2014.11); *H04N 19/176* (2014.11); *H04N 19/557* (2014.11); *H04N 19/85* (2014.11)

(58) Field of Classification Search
None
See application file for complete search history.

(56) References Cited

U.S. PATENT DOCUMENTS 6,567,469 B1   5/2003  Rackett
6,762,758 B2   7/2004  Morein et al.
(Continued)

FOREIGN PATENT DOCUMENTS

CN    101170696 A    4/2008
CN    103096063 A    5/2013
(Continued)

OTHER PUBLICATIONS

Shen et al. "A novel method of sprite generation based on pixel similarity." Image and Graphics (ICIG'04), Third International Conference on. IEEE, 2004.*

(Continued)

*Primary Examiner* — William C Vaughn, Jr.
*Assistant Examiner* — Stuart Bennett
(74) *Attorney, Agent, or Firm* — Maschoff Brennan

(57) ABSTRACT

Disclosed herein are an apparatus and a method of video pre-processing for motion estimation, the apparatus comprising a similarity description module, a storage module, a verdict module, and a motion estimation module. The similarity description module receives a first image in a video, the first image consisting of first blocks, and calculates the similarity descriptors of every first block and a second block of a second image in the video. The second block corresponds to a reference block among the first blocks. The similarity descriptor of each block, which corresponds to a pixel matrix, indicates whether the pixel values of at least one pair of adjacent pixels in the pixel matrix are identical. The verdict module determines whether the similarity descriptors of the second and reference blocks are identical and reaches a verdict, whereby motion estimation is selectively performed on the second block.

20 Claims, 5 Drawing Sheets

(51) Int. Cl.
H04N 19/176 (2014.01)
H04N 19/137 (2014.01)
H04N 19/557 (2014.01)

(56) References Cited

U.S. PATENT DOCUMENTS

| | | | |
|---|---|---|---|
| 7,027,511 | B2 | 4/2006 | Wang et al. |
| 8,111,284 | B1 | 2/2012 | Givon |
| 8,189,051 | B2 | 5/2012 | Shih |
| 8,817,871 | B2 | 8/2014 | Chang |
| 2003/0198295 | A1* | 10/2003 | Chen .................. H04N 5/145 375/240.16 |
| 2005/0025369 | A1* | 2/2005 | Shah .................... H04N 7/15 382/239 |
| 2009/0122867 | A1* | 5/2009 | Mauchly ............ H04N 19/176 375/240.16 |
| 2009/0257493 | A1 | 10/2009 | Ye et al. |
| 2012/0062756 | A1 | 3/2012 | Tian |
| 2012/0212489 | A1 | 8/2012 | Fisk |
| 2013/0195361 | A1 | 8/2013 | Deng et al. |

FOREIGN PATENT DOCUMENTS

| | | |
|---|---|---|
| TW | 201010439 A | 3/2010 |
| TW | I355615 B | 1/2012 |
| TW | 201331772 A | 8/2013 |
| WO | 01/72045 A2 | 9/2001 |

OTHER PUBLICATIONS

Shen et al., "A Novel Method of Sprite Generation Based on Pixel Similarity", Published in Multi-Agent Security and Survivability, 2004 IEEE First Symposium, Dec. 18-20, 2004, pp. 560-563.
Lu et al., "Motion Estimation with Similarity Constraint and Its Application to Distributed Video Coding", Published in Multimedia and Expo, 2007 IEEE International Conference, Jul. 2-5, 2007, pp. 140-143.
TW Office Action dated Aug. 22, 2014 as received in Application No. 102143259.
Bo Zhu et al., "View Synthesis Oriented Depth Map Coding Algorithm" Information Processing, 2009. APCIP 2009. Asia-Pacific Conference on (vol. 2) Jul. 18-19, 2009.
G. Cernigliaro, et al., "A new fast motion estimation and mode decision algorithm for H.264 depth maps encoding in free viewpoint TV" Image Processing (ICIP), 2011 18th IEEE International Conference on Sep. 11-14, 2009.
Han Oh et al., "H.264-Based Depth Map Sequence Coding Using Motion Information of Corresponding Texture Video" Advances in Image and Video Technology Lecture Notes in Computer Science vol. 4319, 2006, pp. 898-907 Dec. 2006.
Liquan Shen et al., "Inter mode selection for depth map coding in 3D video" Consumer Electronics, IEEE Transactions on (vol. 58 , Issue: 3 ) Aug. 2012.
G. Cernigliaro et al., "Low Complexity Mode Decision and Motion Estimation for H.264/AVC Based Depth Maps Encoding in Free Viewpoint Video" Circuits and Systems for Video Technology, IEEE Transactions on (vol. 23 , Issue: 5 ) May 2013.
Ismaël Daribo et al., "Motion vector sharing and bitrate allocation for 3D video-plus-depth coding" EURASIP Journal on Applied Signal Processing—3DTV: Capture, Transmission, and Display of 3D Video archive, Jan. 2009.
M. Wang et al., "Region of Interest oriented fast mode decision for depth map coding in DIBR" Signal Processing and its Applications (CSPA), 2011 IEEE 7th International Colloquium on, Mar. 4-6, 2011.
P. Chiang et al., "Software and hardware design for coding depth map sequence with texture motion information" Circuits and Systems, 2009. ISCAS 2009. IEEE International Symposium on, May 24-27, 2009.
CN Office Action dated Apr. 12, 2017 as received in Application No. 201310730920.4 (English Translation).

* cited by examiner

|   | 1  | 2   | 3  | 4   | 5  |
|---|----|-----|----|-----|----|
| 1 | 32 | 32  | 32 | 32  | 32 |
| 2 | 48 | 127 | 48 | 127 | 48 |
| 3 | 65 | 66  | 69 | 71  | 70 |
| 4 | 65 | 66  | 69 | 71  | 70 |

FIG.3

VIDEO PRE-PROCESSING METHOD AND APPARATUS FOR MOTION ESTIMATION

CROSS-REFERENCE TO RELATED APPLICATIONS

This non-provisional application claims priority under 35 U.S.C. §119(a) on Patent Application No. 102143259 filed in Taiwan, R.O.C. on Nov. 27, 2013, the entire contents of which are hereby incorporated by reference.

TECHNICAL FIELD

The present disclosure relates to video processing, particularly to the usage by motion estimation of computing resources.

BACKGROUND

Motion estimation is an important step in video compression. To describe the frame-by-frame changes in terms of motion vectors, the function block of motion estimation in a video codec receives from the source a frame to be processed and recovers the previous frame from the frame buffer, the previous frame having left the source. The majority of the frame buffer's limited outbound bandwidth is thus often preoccupied, impairing the performance of the codec. Furthermore, video codecs are put on more stringent requirements by the three-dimensional (3D) video extensions to standards such as AVC (Advanced Video Coding) and its successor HEVC (High Efficiency Video Coding), where it is required that depth maps, which describe the distance of each image block in a video to the camera, be compressed parallel to ordinary captured images.

SUMMARY

In light of the above, the present disclosure provides a method and an apparatus of video pre-processing for motion estimation, whose selective execution depends on descriptions of the similarity between pixels in images.

The video pre-processing method provided by this disclosure starts with a first image in a video being received. The first image consists of first blocks, each of which corresponding to a first pixel matrix. A similarity descriptor is calculated for each of the first blocks to indicate whether pixel values of at least one pair of adjacent pixels in the first pixel matrix are identical. A similarity descriptor of a second block of a second image in the video is also calculated. The second block corresponds to a reference block among the first blocks and to a second pixel matrix. The similarity descriptor of the second block is configured to indicate whether pixel values of at least one pair of adjacent pixels in the second pixel matrix are identical. Depending on whether the similarity descriptors of the second and reference blocks are identical, motion estimation is selectively performed on the second block.

The video pre-processing apparatus provided by this disclosure comprises a similarity description module, a storage module, a verdict module, and a motion estimation module. The similarity description module receives a first image in a video, the first image consisting of first blocks, calculates a similarity descriptor of each of the first blocks, and calculates a similarity descriptor of a second block of a second image in the video, the second block corresponding to a reference block among the first blocks. The storage module, coupled with the similarity description module, stores the similarity descriptors of the first blocks. The verdict module, coupled with the storage module, determines whether the similarity descriptor of the second block and the similarity descriptor of the reference block are identical. The motion estimation module, subject to the output of the verdict module, is adapted for performing motion estimation on the second block. Each of the first blocks corresponds to a first pixel matrix, the similarity descriptor of each of the first blocks configured to indicate whether pixel values of at least one pair of adjacent pixels in the first pixel matrix are identical. The second block corresponds to a second pixel matrix, and the similarity descriptor thereof is configured to indicate whether pixel values of at least one pair of adjacent pixels in the second pixel matrix are identical.

BRIEF DESCRIPTION OF THE DRAWING

The present disclosure will become more fully understood from the detailed description given herein below and the accompanying drawings which are given by way of illustration only and thus are not limitative of the present disclosure and wherein:

FIG. 3 is a diagram of a pixel matrix.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
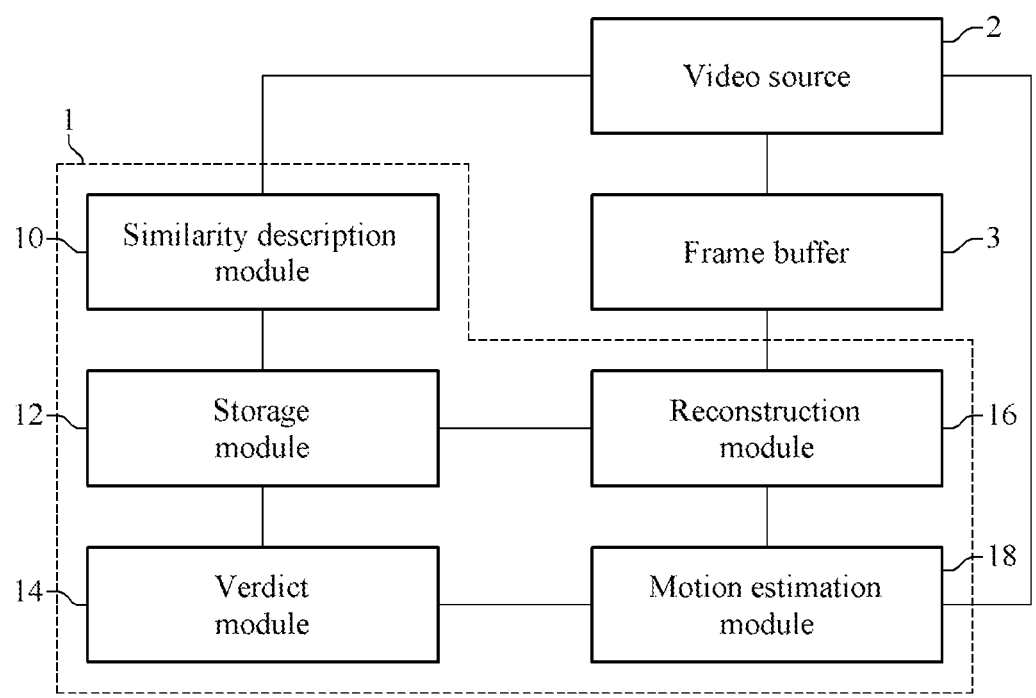
FIG. 1 is a high-level block diagram of a video pre-processing apparatus for motion estimation, in accordance with one embodiment of the present disclosure.

Please refer to FIG. 1. As shown in the block diagram, a video pre-processing apparatus 1 for motion estimation is coupled with a (video) source 2 and a frame buffer 3 and comprises a similarity description module 10, a storage module 12, a verdict module 14, a reconstruction module 16, and a motion estimation module 18. The storage module 12 may be a buffer adapted for storing the calculation results of the similarity description module 10. The similarity description module 10, the motion estimation module 18, and the frame buffer 3 are all capable of receiving a frame to be presently processed from the source 2. Previous images, having left the source 2, are temporarily harbored in the frame buffer 3, whence the reconstruction module 16 may load some of the bits of these previous images out of necessity. In one embodiment, the modules mentioned above are substantiated by integrated circuits. In another embodiment, the video pre-processing apparatus 1 further includes a processor that obtains at least a piece of readable program code from one or more memory modules to function as the said modules.

Figure 2:
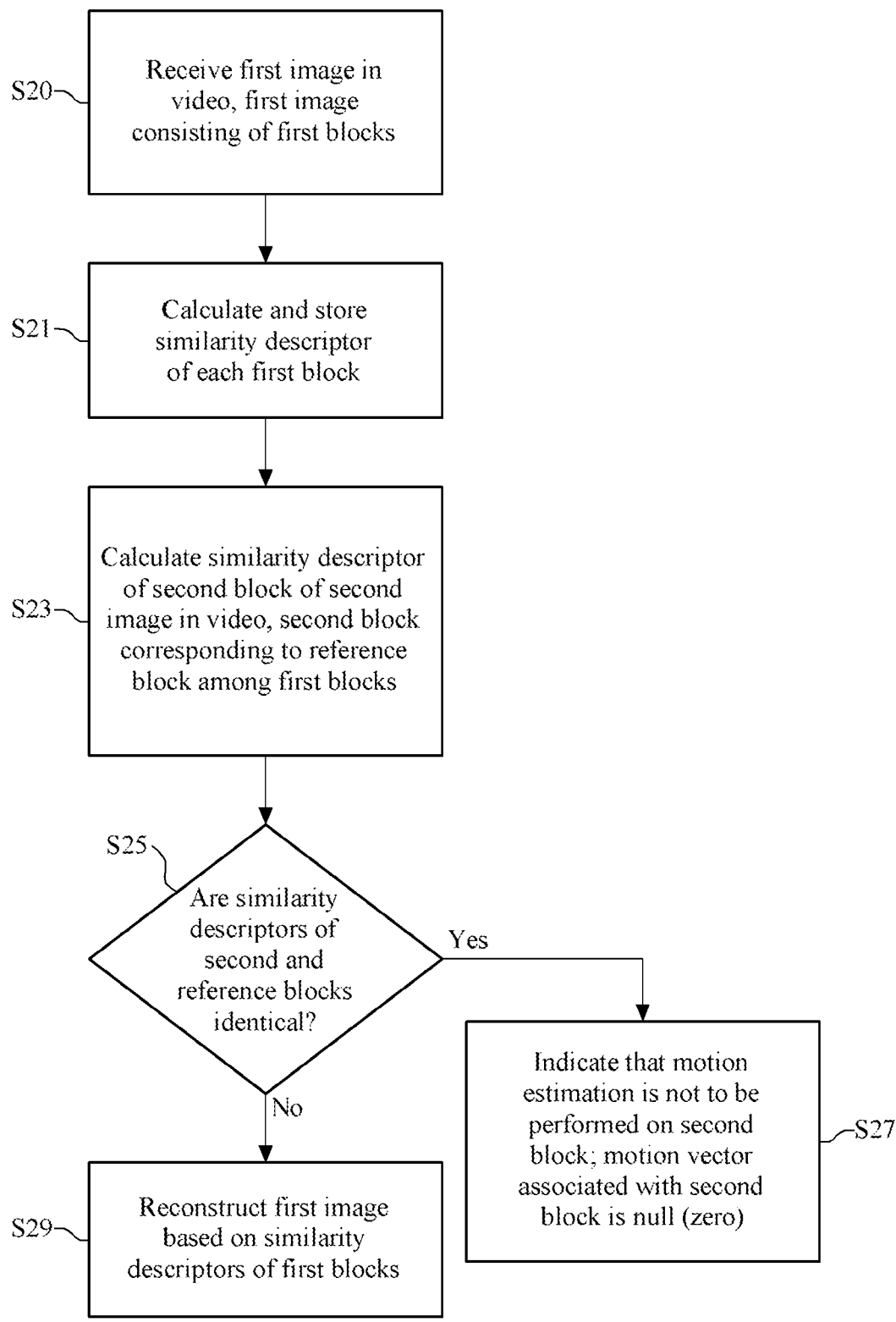
FIG. 2 is a flowchart of a video pre-processing method for motion estimation, in accordance with one embodiment of the present disclosure.

Please refer to FIG. 2 with regard to FIG. 1. As shown in the flowchart, in step S20 the similarity description module 10 receives a first image in a video from the source 2. (Meanwhile, the first image leaves the source 2 and enters the frame buffer 3.) The first image is divided into first blocks, each of which corresponding to a first pixel matrix. In step S21, the similarity description module 10 calculates and saves in the storage module 12 a similarity descriptor of each first block. The similarity description module 10 then receives a second image in the same video from the source 2 in order to calculate in step S23 a similarity descriptor of a second block of the second image. (Meanwhile, the second image leaves the source 2 and is received by the motion estimation module 18.) Generally speaking, the first and second images are consecutive frames in the video, and to perform motion estimation on a block of the second image refers to a relative motion vector in the procession of the video being obtained for that block and a corresponding reference block of the first image, the two blocks displaying, for instance, identical or similar objects. In the current embodiment, the block having the same relative position in the first image as the second block in the second image is chosen as the reference block. In other embodiments, a prediction vector in the coordinate system of the first or second image dictates a relative position of the reference block in the first image and another of the second block in the second image. In step S25, the verdict module 14 obtains the similarity descriptors of the second and reference blocks from the storage module 12. In another embodiment, the verdict module 14, connected to the similarity description module 10, obtains directly thence the similarity descriptor of the second block. The verdict module 14 directs the motion estimation module 18 to skip the second block if it determines that the similarity descriptors of the second and reference blocks are identical. In the embodiment where the relative positions of the second and reference blocks are the same, a motion vector associated with the second block is therefore assigned null (zero) by the motion estimation module 18 in step S27; in other embodiments, the motion vector associated with the second block is the prediction vector.

The reconstruction module 16 obtains the similarity descriptors of all the first blocks from the storage module 12 and thereby reconstructs the first image in step S29 if the verdict module 14 does not consider the similarity descriptors of the second and reference blocks identical. The reconstruction module 16 loads from the frame buffer 3 parts of the first image where the similarity descriptors come up short describing. The reconstructed first image is then fed into the motion estimation module 18. Please note that what is shown in FIG. 1 is merely one of the many examples of the connections between the verdict module 14, the reconstruction module 16, and the motion estimation module 18. In this embodiment, the motion estimation module 18 may, upon instruction from the verdict module 14, request the first image from the reconstruction module 16, which in turn retrieves similarity descriptors from the storage module 12, or it may be that the reconstruction module 16 reconstructs the first image anyhow based on the similarity descriptors of all the first blocks, and the motion estimation module 18 either fetches or ignores that depending on the verdict module 14. In another embodiment, the verdict module 14 is concurrently connected to the reconstruction module 16 and the motion estimation module 18, so the former need not wait for a request from the motion estimation module 18 to commence the reconstruction.

The motion estimation module 18 performs motion estimation on the second block with the reconstructed first image. In particular, the motion estimation module 18 may implement block matching, pixel recursion, phase correlation, or optical flow algorithms in general, as seen fit by a person skilled in the art.

The similarity descriptor of one of the first blocks or the second block is calculated from the block's corresponding pixel matrix. As exemplified in FIG. 3, a pixel matrix has m lines along a first direction and n lines along a second, m being a positive integer not less than 1, n being a positive integer greater than 1. Specifically, the first direction is horizontal in FIG. 3, the m lines therefore also known as columns with m=5, while there are n=4 lines or rows along the vertical second direction. Please note that in other embodiments the first and second directions may be vertical and horizontal, respectively, or even non-orthogonal bases. The rows and columns are also numbered in FIG. 3 as marked on the circumference of the pixel matrix. The numbers along one direction are interchangeable.

Figure 4:
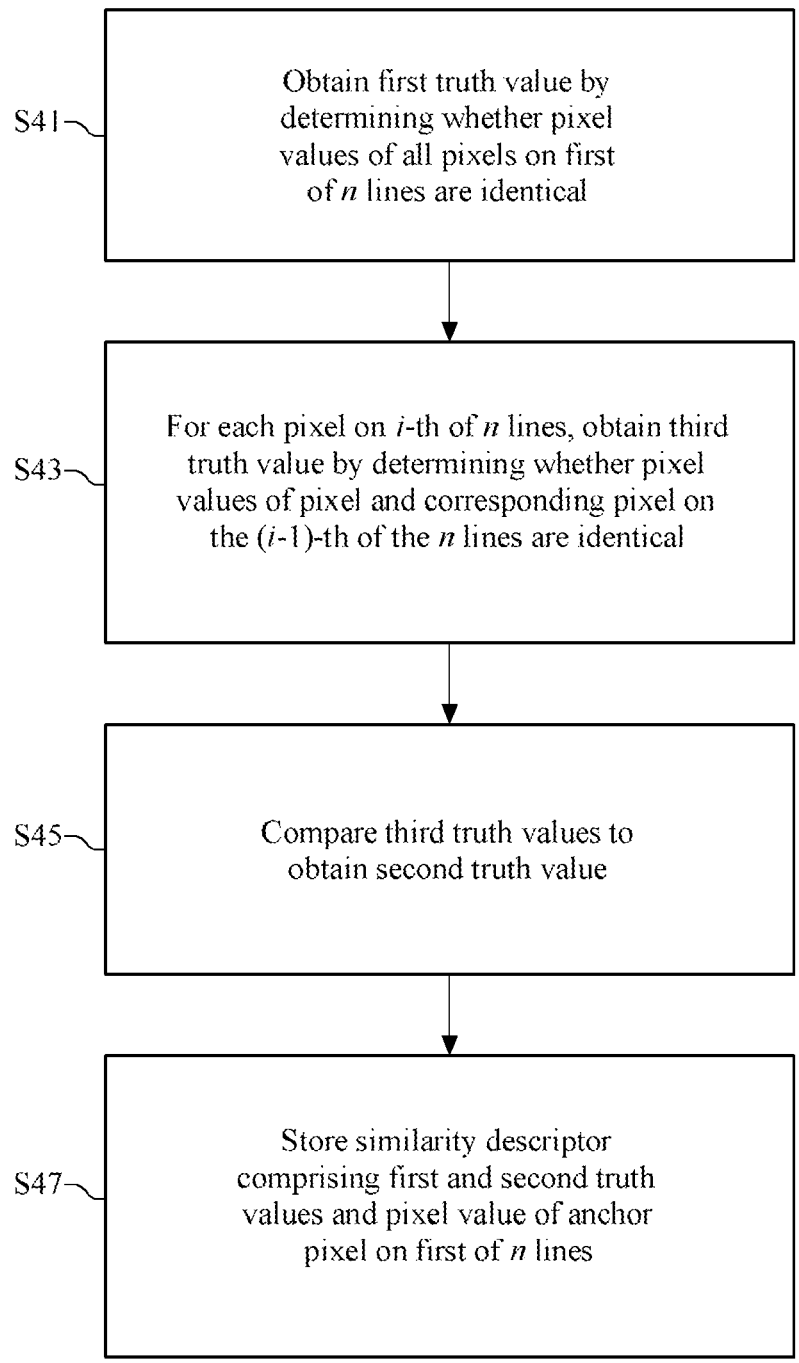
FIG. 4 is a flowchart illustrating the calculation of a similarity descriptor, in accordance with one embodiment of the present disclosure.

Please refer to FIG. 4 with regard to FIG. 3 for an illustration of the calculation of a similarity descriptor. As shown in the flowchart, in step S41 the similarity description module 10 determines whether the five pixels on the first row have the same pixel values. If they do, a first truth or Boolean value is set to true or 1; if not (any of the five is different from the others), then the first truth value is false or 0. Here a pixel value refers to some data associated with a pixel, for instance hue, tone, saturation, and/or lightness in a true-color image, or grayscale intensity in a depth map. The first truth value associated with this pixel matrix (and its corresponding image block) is 1 due to all the values on the first row being 32. In practice, a plurality of truth values (m−1=4 of them for the pixel matrix in FIG. 3) may be obtained by determining whether the pixel values of every pair of adjacent pixels on the first row are identical and compared with each other by logical conjunction or other operators to yield the first truth value.

The similarity description module 10 then determines whether the i-th and (i−1)-th rows are the same, i being a positive integer greater than 1 yet not greater than n. Assume that i=3 for a detailed example. In step S43, the similarity description module 10 compares the first pixel on the third row (65) with a corresponding pixel on the second row. In one embodiment, such correspondence refers to the pixels being on the same column; in other words, the corresponding pixel is the leftmost 48 on the second row. 65 is not equal to 48, hence the third truth value associated with the first pixel on the third row is 0. As a matter of fact, the third truth values of all the pixels on the third row are 0, but those of the pixels on the fourth row are 1, for the third and fourth rows are exactly identical. In step S45, the similarity description module 10 compares the third truth values on the same row by logical conjunction or other operators to obtain the second truth value associated with that row. The second truth value associated with the third row is 0 for one of the row's third truth value is 0. The third and fourth rows are exactly identical, rendering the second truth value associated with the fourth row 1. Finally, the similarity description module 10 stores the said first truth value, second truth values (of all the rows), and the pixel value of an anchor pixel as the similarity descriptor of the image block corresponding to this matrix into the storage module 12 in step S47. The anchor pixel is an arbitrary one on the first row, e.g. the pixel on the first column and the first row (32). For the pixel matrix at hand, the similarity descriptor may be expressed as the tuple (32, h=1, $v_2$=0, $v_3$=0, $v_4$=1), wherein h is the first truth value, and $v_i$ the second truth value associated with the i-th row.

Figure 5:
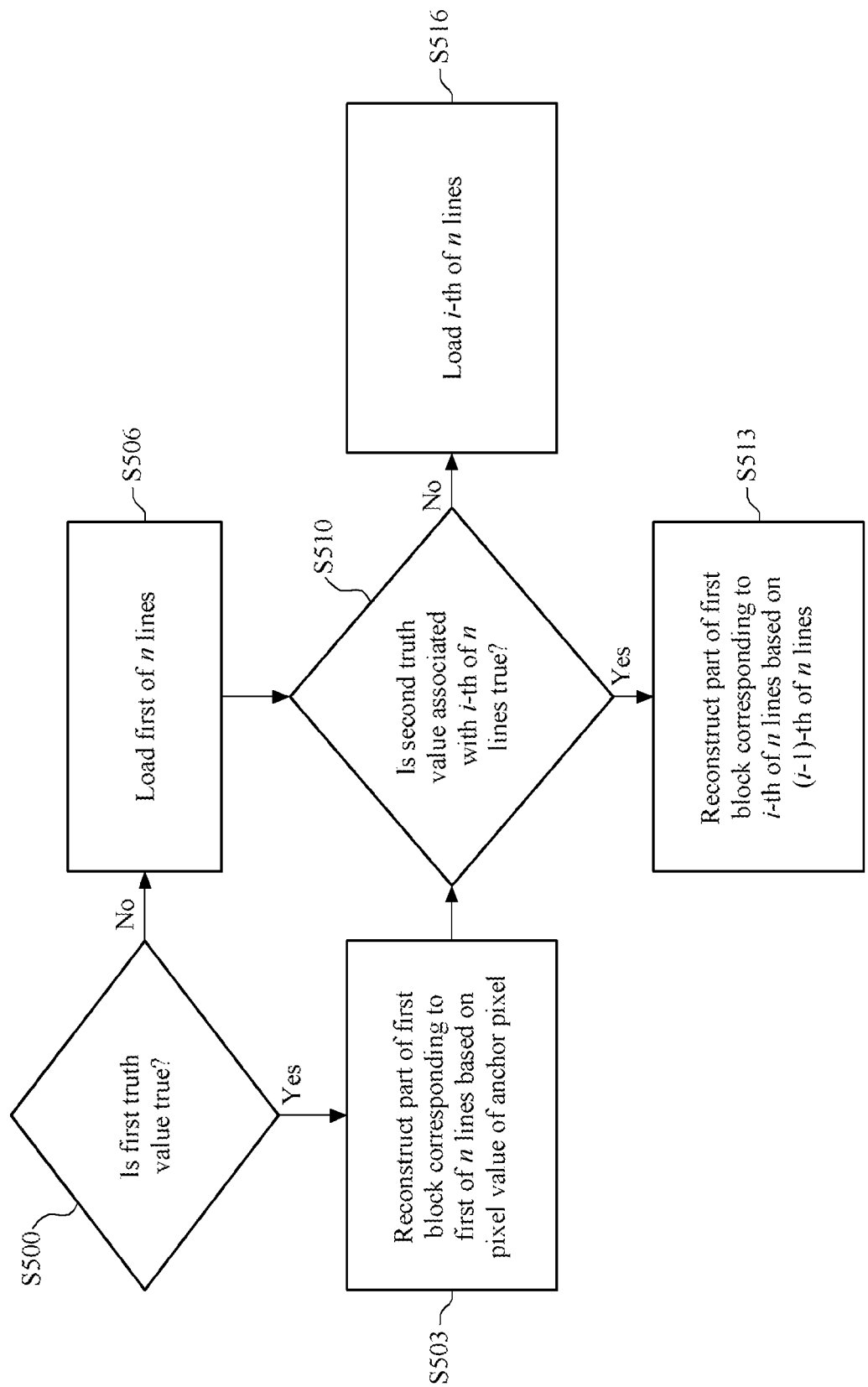
FIG. 5 is a flowchart illustrating the reconstruction of a first block, in accordance with one embodiment of the present disclosure.

With the similarity descriptors of all the first blocks, the reconstruction module 16 is able to reconstruct a complete first image block-by-block. Please refer to FIG. 5 with regard to FIG. 3 for an illustration of the reconstruction of a first block. As shown in the flowchart, after obtaining from the storage module 12 the similarity descriptor of a first block, the reconstruction module 16 determines in step S500 whether the first truth value is 1. If it is not, not all the pixels are the same on the first row of the matrix representing this first block, and the reconstruction module 16 reads the bits of the first row from the frame buffer 3 in step S506. If the first truth value is 1, the reconstruction module 16 recovers the first row by copying the pixel value of the anchor pixel from the similarity descriptor in step S503, for all the pixels on that row, including the anchor, are identical. In step S510, the reconstruction module 16 sequentially determines whether each of the second truth values is 1. Continuing with the example of the previous paragraph, $v_2$=0, meaning the second and first rows are at least partly different, prompting the reconstruction module 16 to read the bits of the second row from the frame buffer 3 in step S516. It is much the same for the third row, but since $v_4$=1, the reconstruction module 16 may recover the fourth row simply by copying the third in step S513.

In one embodiment of the present disclosure, the similarity descriptor of a block further records a second truth value associated with the first row, $v_1$. $v_1$ may be the result of the similarity description module 10 comparing the first row of the current block and the last row of another one previously processed. In the block reconstruction exemplified in FIG. 5, the reconstruction module 16 may determine whether $v_1$ is 1 before step S500. If it is, the first row is recovered based on the previous block and step S510 is executed; if not, the reconstruction module 16 performs step S500.

It is intended that the specification and examples be considered as exemplary only, with a true scope and spirit of the invention being indicated by the following claims.

What is claimed is:

1. A video pre-processing method for motion estimation, comprising:
   receiving a first image in a video, the first image consisting of a plurality of first blocks, each of which corresponding to one of a plurality of first pixel matrices;
   for each of the first blocks, calculating a similarity descriptor of the first block, the similarity descriptor of the first block configured to indicate whether a plurality of pixel values of at least one pair of adjacent pixels in the corresponding first pixel matrix are identical;
   calculating a similarity descriptor of a second block of a second image in the video, the second block corresponding to a reference block among the first blocks and to a second pixel matrix, the similarity descriptor of the second block configured to indicate whether a plurality of pixel values of at least one pair of adjacent pixels in the second pixel matrix are identical;
   reaching a verdict on whether the similarity descriptor of the second block and the similarity descriptor of the reference block are identical; and
   selectively performing motion estimation on the second block based on the verdict;
   wherein there are m lines along a first direction and n lines along a second direction in each of the first pixel matrices or in the second pixel matrix, m being a positive integer not less than 1, n being a positive integer greater than 1, and calculating the similarity descriptor of each of the first blocks or the second block comprises:
   obtaining a first truth value by determining whether a plurality of pixel values of all the pixels on the first of the n lines are identical; and
   obtaining a second truth value associated with the i-th of the n lines by determining whether the i-th and the (i−1)-th of the n lines have identical characteristics, i being a positive integer greater than 1 and not greater than n;
   wherein the similarity descriptor of each of the first blocks or the second block comprises the first truth value, the second truth value, and a pixel value of an anchor pixel on the first of the n lines.

2. The video pre-processing method of claim 1, wherein obtaining the second truth value by determining whether the i-th and the (i'−1)-th of the n lines have identical characteristics comprises:
   for each pixel on the i'-th of the n lines, obtaining one of a plurality of third truth values by determining whether a plurality of pixel values of the pixel and another pixel, which is on the (i'−1)-th of the n lines and corresponds to the pixel, are identical; and
   comparing the third truth values with each other to obtain the second truth value.

3. The video pre-processing method of claim 2, wherein the second truth value is a product of the third truth values.

4. The video pre-processing method of claim 2, wherein the pixel and the other pixel are on one of the m lines.

5. The video pre-processing method of claim 1, wherein motion estimation is performed on the second block when the verdict indicates that the similarity descriptor of the second block and the similarity descriptor of the reference block are not identical.

6. The video pre-processing method of claim 5, further comprising:
   reconstructing the first image based on the similarity descriptor of each of the first blocks after calculating the similarity descriptor of the first block.

7. The video pre-processing method of claim 6, wherein reconstructing the first image comprises, for each of the first blocks:
   reconstructing a part of the first block corresponding to the first of the n lines based on the pixel value of the anchor pixel if the first truth value of the similarity descriptor of the first block is true;
   loading the first of the n lines if the first truth value of the similarity descriptor of the first block is false;
   reconstructing a part of the first block corresponding to the i'-th of the n lines based on the (i'−1)-th of the n lines if the second truth value, which is associated with the i'-th of the n lines and of the similarity descriptor of the first block, is true; and
   loading the i'-th of the n lines if the second truth value, which is associated with the i'-th of the n lines and of the similarity descriptor of the first block, is false.

8. The video pre-processing method of claim 1, wherein a relative position of the second block in the second image and a relative position of the reference block in the first image are associated with a prediction vector, a motion vector associated with the second block equated to the prediction vector when the verdict indicates that the similarity descriptor of the second block and the similarity descriptor of the reference block are identical.

9. The video pre-processing method of claim 8, wherein the prediction vector is a null (zero) vector.

10. The video pre-processing method of claim 1, wherein the pixel value of a pixel is based on a grayscale.

11. A video pre-processing apparatus for motion estimation, comprising
a similarity description circuit for receiving a first image in a video, the first image consisting of a plurality of first blocks, for calculating a similarity descriptor of each of the first blocks, and for calculating a similarity descriptor of a second block of a second image in the video, the second block corresponding to a reference block among the first blocks;
a buffer coupled with the similarity description circuit and for storing the similarity descriptor of each of the first blocks;
a verdict circuit coupled with the buffer and for reaching a verdict on whether the similarity descriptor of the second block and the similarity descriptor of the reference block are identical; and
a motion estimation circuit subject to the verdict and for performing motion estimation on the second block;
wherein each of the first blocks corresponds to one of a plurality of first pixel matrices, the similarity descriptor of each of the first blocks is configured to indicate whether a plurality of pixel values of at least one pair of adjacent pixels in the corresponding first pixel matrix are identical, the second block corresponds to a second pixel matrix, and the similarity descriptor of the second block is configured to indicate whether a plurality of pixel values of at least one pair of adjacent pixels in the second pixel matrix are identical, wherein there are m lines along a first direction and n lines along a second direction in each of the first pixel matrices or in the second pixel matrix, m being a positive integer not less than 1, n being a positive integer greater than 1, and when the similarity description circuit calculates the similarity descriptor of each of the first blocks or the second block, the similarity description circuit obtains a first truth value by determining whether a plurality of pixel values of all the pixels on the first of the n lines are identical and obtains a second truth value associated with the i-th of the n lines by determining whether the i-th and the (i−1)-th of the n lines have identical characteristics, i being a positive integer greater than 1 and not greater than n;
wherein the similarity descriptor of each of the first blocks or the second block comprises the first truth value, the second truth value, and a pixel value of an anchor pixel on the first of the n lines.

12. The video pre-processing apparatus of claim 11, wherein when the similarity description circuit obtains the second truth value by determining whether the i-th and the (i−1)-th of the n lines have identical characteristics, the similarity description circuit obtains, for each pixel on the i-th of the n lines, one of a plurality of third truth values by determining whether a plurality of pixel values of the pixel and another pixel are identical and compares the third truth values with each other to obtain the second truth value, the other pixel being on the (i−1)-th of the n lines and corresponding to the pixel.

13. The video pre-processing apparatus of claim 12, wherein the second truth value is a product of the third truth values.

14. The video pre-processing apparatus of claim 12, wherein the pixel and the other pixel are on one of the m lines.

15. The video pre-processing apparatus of claim 11, wherein the motion estimation circuit performs motion estimation on the second block when the verdict indicates that the similarity descriptor of the second block and the similarity descriptor of the reference block are not identical.

16. The video pre-processing apparatus of claim 15, further comprising a reconstruction circuit coupled with the buffer and for reconstructing the first image based on the similarity descriptor of each of the first blocks after calculating the similarity descriptor of the first block.

17. The video pre-processing apparatus of claim 16, wherein when the reconstruction circuit reconstructs the first image, for each of the first blocks the reconstruction circuit reconstructs a part of the first block corresponding to the first of the n lines based on the pixel value of the anchor pixel if the first truth value of the similarity descriptor of the first block is true, loads the first of the n lines if the first truth value of the similarity descriptor of the first block is false, reconstructs a part of the first block corresponding to the i-th of the n lines based on the (i−1)-th of the n lines if the second truth value is true, and loads the i-th of the n lines if the second truth value is false, the second truth value associated with the i-th of the n lines and of the similarity descriptor of the first block.

18. The video pre-processing apparatus of claim 11, wherein a relative position of the second block in the second image and a relative position of the reference block in the first image are associated with a prediction vector, a motion vector associated with the second block equated to the prediction vector when the verdict indicates that the similarity descriptor of the second block and the similarity descriptor of the reference block are identical.

19. The video pre-processing apparatus of claim 18, wherein the prediction vector is a null (zero) vector.

20. The video pre-processing apparatus of claim 11, wherein the pixel value of a pixel is based on a grayscale.

* * * * *